Oct. 3, 1967 G. V. JACOBY 3,345,008

TAPE REEL SERVO

Filed Oct. 20, 1965 2 Sheets-Sheet 1

INVENTOR.
George V. Jacoby
BY John V. Regan
Attorney

Oct. 3, 1967 G. V. JACOBY 3,345,008

TAPE REEL SERVO

Filed Oct. 20, 1965 2 Sheets-Sheet 2

INVENTOR.
George V. Jacoby
BY John V. Regan
Attorney

United States Patent Office 3,345,008

Patented Oct. 3, 1967

3,345,008
TAPE REEL SERVO

George V. Jacoby, Bala-Cynwyd, Pa., assignor to Radio Corporation of America, a corporation of Delaware Filed Oct. 20, 1965, Ser. No. 498,909
10 Claims. (Cl. 242—55.12)

ABSTRACT OF THE DISCLOSURE

A tape reel servo arrangement is described as including a nonlinear circuit arrangement in the rate damping loop of the reels. The nonlinear arrangement includes a clamping circuit and a low pass filter for clamping the low frequency components of the rate damping signal to a predetermined value and further includes a nonlinear attenuator having an impedance which varies as a function of the rate damping signal amplitude.

This invention relates to tape apparatus and more particularly to a system for driving the supply and takeup reels of a magnetic tape station.

In general, magnetic tape stations include a supply and a takeup reel between which the tape is reeled by a tape drive arrangement past a magnetic recording head. In one type of drive arrangement forward and reverse capstans translate the tape between the reels and past the recording head. In accelerating the tape from rest to a very high speed in a very short time (for example, 150 inches per second in three milliseconds), the capstans impart relatively large accelerations to the tape. Due to the inertia of the reels, such high acceleration or deceleration is apt to produce undesired effects, such as stretching or breaking, of the tape. In order to isolate the forward and reverse capstans from the reels, relatively low inertia tape loops are disposed in tape loop reservoirs between each capstan and one of the reels. Reel motors are provided to drive the reels so that the supply reel deposits tape into its associated loop while the takeup reel removes tape from its associated loop.

During continuous run the forward or reverse capstan drives the tape between the tape loop reservoirs at a constant speed. However, the positions of the tape loops in the tape reservoir tend to vary since the speed of the tape is directly proportional to the radius of the tape on the reel. That is, the supply reel tends to supply less tape at relatively slower speeds to its associated tape loop reservoir while the takeup reel tends to take up more tape at relatively faster speeds. Consequently, in order to maintain a tape loop position which is independent of the amount of tape on the reels, it is necessary to provide a servo arrangement which tends to maintain a relatively constant tape loop position.

Prior art reel servo arrangements for maintaining relatively constant tape loop positions include mechanical or optical means for sensing the radius of the tape on the reels and providing an additional feedback signal inversely proportional to the radius. However, these arrangements are not readily implemented, especially where the tape and reels are of the cartridge type. Moreover, the mechanical arrangements sometimes involve a physical abrasive contact with the tape, while the optical arrangements are susceptible to dust and dirt accumulating at the light source.

The tape loop excursions can also be excessive during cycling operations wherein the tape may be started, stopped or reversed in any desired order at rates of occurrence up to fifty and more operations per second. Again, it is desirable to limit the tape loop excursions.

It is an object of this invention to provide an improved servo arrangement for driving the supply and takeup reels in a magnetic tape station.

It is another object of this invention to provide a reel servo arrangement which is simple and reliable and which does not include mechanical or optical sensing means associated with the tape wound on the reels.

The magnetic tape station with which the present invention is utilized includes a source of command signals, a pair of tape reels driven by a pair of reel motors, a pair of capstans disposed between the reels and a pair of tape loop reservoirs each located between different ones of the capstans and the reels. The reel servo arrangement in accordance with the present invention includes separate servos for each reel and reel motor. Each servo includes a tachometer generator for developing a rate damping signal which is directly proportional to the rotational velocity of the reel or reel motor. As mentioned previously, the rotational velocity of the reel increases as the amount of tape wound on the reel decreases, thereby tending to change the position of the tape loop or the amount of tape in the tape reservoir. In order to minimize the movement of the tape loop, one feature of the present invention provides a clamping arrangement for clamping the rate damping signal to a predetermined value. A low pass filter is operative during continuous run of the tape to pass only the low frequency components of the clamped rate damping signal. A signal adding circuit adds the clamped rate damping signal components and the command signals and applies the sum thereof to a motor control circuit which controls the reel motor.

Another feature of the present invention provides a high pass filter for passing the high frequency components of the rate damping signal to the signal adding circuit during continuous run in order to prevent oscillations of the servo system.

A further feature of the invention provides a nonlinear attenuator for attenuating the high frequency signal components of the rate damping signal during cycling operation of the tape station.

Figure 1:
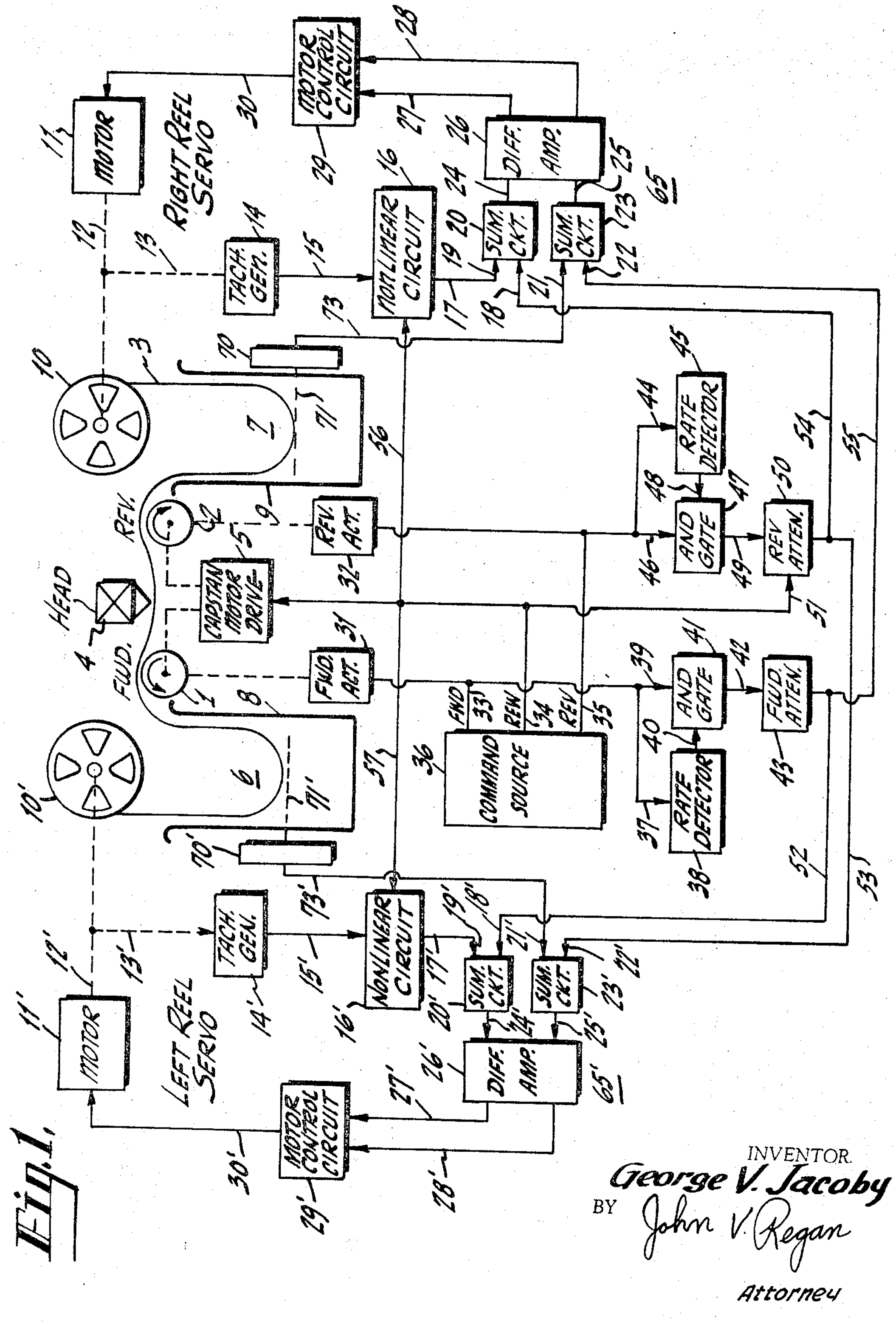
FIG. 1 is a block diagram of a tape transport included in a magnetic tape station in accordance with the teaching of the present invention.

Referring now to FIG. 1 a magnetic tape 3 is shown wound on right and left tape reels 10 and 10' respectively. Forward and reverse capstans 1 and 2 drive the tape 3 between the reels 10 and 10' and pass a magnetic recording head 4. The magnetic head 4 is capable of writing information on the tape 3 and reading information therefrom in accordance with appropriate commands received, for example, from a data processor system, not shown, or from an operator. The capstans 1 and 2 are continuously driven in opposite directions (as indicated by the arrows) by a capstan motor drive 5. The reverse capstan 2, for example, is made to grip and drive the tape in the reverse direction by means of a reverse vacuum actuator 32 operated in response to a reverse command signal supplied by a command source 36 by way of a reverse lead 35. The command source 36 may be associated with, or be part of, a data processor with which the tape station is utilized. For reverse tape motion the reel 10' operates as a supply reel; the reel 10 operates as a takeup reel. Similarly, the forward capstan 1 may be made to grip and drive the tape in the forward direction by means of a forward vacuum actuator 31 operated in response to a forward command signal supplied by the command source 36 over a forward lead 33. For forward tape motion the tape reel 10 operates as a supply reel; while the tape reel 10' operates as a take-up reel.

The path of the tape 3 includes low inertia storage reservoirs 8 and 9 in which tape loops 6 and 7 are formed by vacuum means, not shown. Guide means, not shown, may be provided to guide the tape 3 into and out of the storage reservoirs 8 and 9.

In addition to the previously mentioned forward and reverse operational modes of the tape transport, the capstan motor drive 5 is capable of operation in a fast rewind mode in response to a rewind command signal supplied by the command source 36 by way of a rewind lead 34. The capstan motor drive 5 may include forward and reverse motor means for continuously driving the capstans 1 and 2. The reverse motor means may include either a single motor of which the speed is increased in response to the rewind command signal or may include a normal reverse drive motor and a rewind drive motor. For the last mentioned case, the normal reverse drive motor is normally operative to drive the reverse capstan at a normal speed; while the rewind drive motor is responsive to the rewind command signal to drive the reverse capstan at a more rapid speed.

The right and left reels 10 and 10' are driven by motors 11 and 11', respectively, which may be series direct current motors. Right and left servos are associated with the motors 11 and 11' for instantaneously driving the reel motors in response to the command signals and for controlling the speed of the reels in accordance with the position of the tape loops and the amount of tape wound on the reels. The right and left servos include similar components which bear identical reference symbols except that the left servo's reference symbols are primed. Therefore, only the right servo will be described in detail.

The right servo includes a signal adding circuit 65 which includes individual summing circuits 20 and 23 for summing the command signals, the tape loop position signal and a rate damping signal. The outputs of the summing circuits 20 and 23 are applied by way of a differential amplifier 26 to a motor control circuit 29 which controls the speed and direction of the motor 11. The differential amplifier and the motor control circuit may be of the types disclosed in my copending application Serial No. 291,857, filed July 1, 1963, entitled Tape Handling Apparatus.

In the description which follows the command signal inputs, the tape loop position input and the rate damping input to the signal adding circuit will be considered in the named order.

The right and left servos are made responsive to the command signals by means of "and" gate circuits 41 and 47 which have their respective inputs 39 and 46 connected to the forward and reverse command leads 33 and 35, respectively. The forward and reverse command leads are also connected to the inputs 37 and 44 of rate detectors 38 and 45, respectively. The outputs of the rate detectors are applied to the inputs 40 and 48 of the "and" gates 41 and 47, respectively. The rate detectors 38 and 45 respond to the rate of the command signals and either inhibit or enable the "and" gates to transmit the forward and reverse command signals when the command signal rate is higher or lower than a predetermined rate. For a detailed description of the operation of the rate detectors reference is made to my aforementioned copending application.

The outputs of the "and" gates 41 and 47 are coupled to the inputs 42 and 49 of the forward and reverse attenuators 43 and 50, respectively. Also connected to an input 51 of the reverse attenuator 50 is the rewind command lead 34. The forward and reverse attenuators are conventional and may include passive resistive networks.

By way of illustration, the reverse attenuator 50 may be of the type described in connection with FIG. 3. For normal reverse speed operation the attenuator input 49 couples the reverse command signal from the "and" gate 47 by way of series and shunt resistors 60 and 61, respectively, to the branch outputs 53 and 54. During the fast rewind operational mode a relay 62 is responsive to the rewind command signal to close its normally open switch contact 63, thereby shorting a portion of the series resistor 60. To this end the closed contact 63 connects the wiper contact 64 on the series resistor 60 directly to the output circuit branches 53 and 54. Consequently, the reverse attenuator responds to rewind command signals to short circuit a portion of the series resistor 60, thereby providing a larger signal to the circuit branches 53 and 54.

The reverse attenuator output is coupled by way of leads 53 and 54 to the inputs 22' and 18 of the summing circuits 23' and 20 of the left and right servos, respectively. The forward attenuator output similarly is coupled by way of leads 52 and 55 to the inputs 18' and 22 of the summing circuits 20' and 23, respectively.

The right servo is made responsive to the deviations of the bight portion of the tape loop 7 from a reference position 71 by means of a loop position sensor 70 which is coupled by way of lead 73 to the input 21 of the summing circuit 23. The sensor 70 is a known device including a plurality of photosensitive devices associated with a circuit for combining the individual outputs of the devices and applying the resultant output to the lead 73. Also associated with the photosensitive devices is a light source means, not shown. The output signal on the lead 73 from the loop sensor 70 may have one polarity when the tape loop 7 is above the position 71 and may have the opposite polarity when the loop extends below the position 71. In addition, the amplitude of the output sensor signal may vary in accordance with the distance of the loop 7 from the position 71 in order to limit the excursions of the tape loop during cycling operations. For a more detailed description of the loop sensor 70, reference is made to my aforementioned copending application.

A rate damping signal which is proportional to the speed of the motor 11 is developed by a tachometer generator 14 which is coupled to the motor as illustrated by the dashed line 13. The rate damping signal is coupled by way of a lead 15 to a nonlinear circuit 16 which is coupled by way of a lead 17 to the input 19 of the summing circuit 20.

The nonlinear circuit 16 is operative to clamp the rate damping signal to a voltage having predetermined values of either one or the other polarity depending upon the polarity of the rate damping signal. The purpose of the clamping circuit will now be explained. During continuous run of the tape between the two reels, for example, from the right to the left reel, the radius of the tape pack wound on the right reel slowly varies from a maximum value to a minimum value. The rotational speed of the reel or motor is inversely proportional to the tape pack radius, and therefore tends to slowly increase as the radius slowly decreases. The net result is that the rate damping signal tends to slowly increase like a slowly variable D.C. signal. In addition, the position of the bight portion of the tape loop 7 also tends to change in accordance with the change in speed of the reel 10. When the rate damping signal attains a predetermined value, the circuit 16 clamps the rate damping signal thereto. This predetermined value may be selected as the value of the rate damping signal amplitude when the tape pack on the reel 10 is full or when the tape pack radius is a maximum. For this choice the rate damping signal is almost always clamped to the predetermined value during continuous run, thereby preventing shifts in position of tape loop 7.

Shifts of the position of the tape loop 7 are particularly serious during the fast rewind operational mode. For this operational mode the predetermined value should be larger than the predetermined value for the normal operational modes. To this end, the rewind command lead 34 is connected by way of leads 56 and 57 to the clamping circuits 16 and 16', respectively. The nonlinear circuit 16 includes switching circuitry described hereinafter operated in response to the rewind command signal for switching from the normal clamping circuit to a fast rewind clamping circuit.

The nonlinear circuit 16 also may be operative during cycling operational modes to limit the excursions of the tape loop for the case where the loop position sensor does not perform this function. When the tape loop position changes in accordance with the rapidly occurring command signals, the rate damping signal tends to rapidly change such that its principal components are high frequency transients. In order to limit the tape loop excursions, the nonlinear circuit 16 attenuates these high frequency signal components in a nonlinear manner such that the signal attenuation increases as the rate damping signal amplitude increases.

The nonlinear circuit 16 may include low and high pass circuit branches with a clamp arrangement in the low pass branch and the nonlinear attenuator in the high pass branch. Moreover, the high frequency branch may continuously pass the high frequency signal components of the rate damping signal during continuous run without attenuation thereby preventing oscillations in the servo system. The crossover frequency between the low and high pass circuit branches must be less than the frequency at which the servo loop gain is unity.

Figures 2, 3:
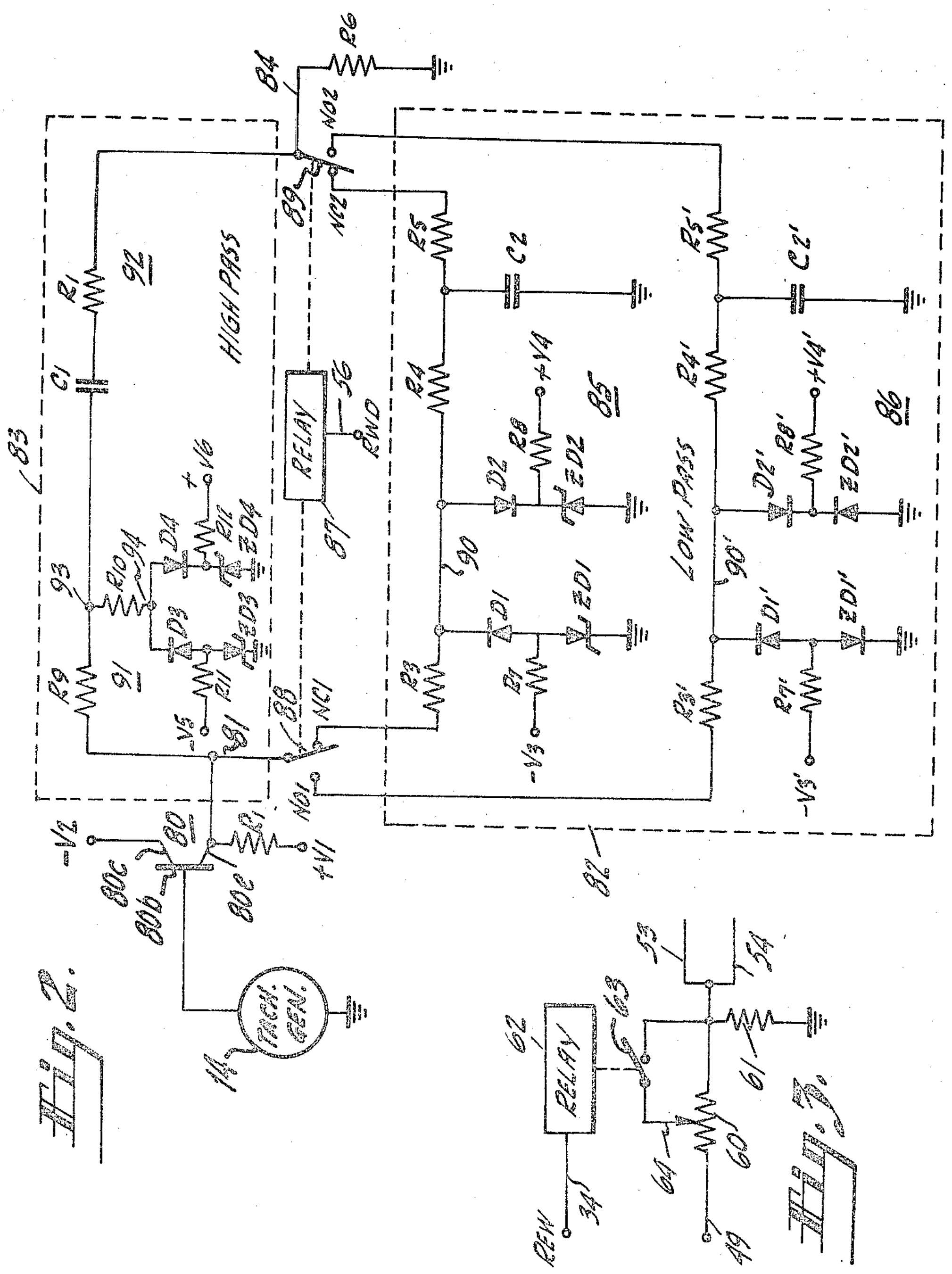
FIG. 2 is a circuit diagram of a clamp, filter and nonlinear attenuator arrangement which may be used for the nonlinear circuit in the block diagram of FIG. 1.
FIG. 3 is a curcuit diagram of an attenuator which may be used for the reverse attenuator in the block diagram of FIG. 1.

By way of illustration, the circuit shown in FIG. 2 may be used for the nonlinear circuit 16. The rate damping signal developed by the tachometer generator 14 is coupled to the base electrode 80*b* of the transistor 80 which is connected for current amplification in the emitter follower configuration. The emitter electrode 80*e* is connected by way of a resistance R1 to the positive terminal of a voltage supply V1; while the collector electrode 80*c* is directly connected to the negative terminal of a voltage supply V2. The negative and positive terminals, not shown, of the voltage supplies V1 and V2, respectively, are connected to circuit ground.

The current amplified rate damping signal is coupled from the emitter electrode 80*e* to a circuit point 81. The circuit point 81 is connected to low and high pass circuit branches 82 and 83. The low pass circuit branch includes a normally operative low pass clamping circuit 85 and another similar low pass clamping circuit 86 which is operative only during the rewind operational mode. The low pass clamping circuit 85 is connected by way of the normally closed relay switch contacts NC1 and NC2 to the circuit point 81 and to the output point 84, respectively. The output point 84 is connected to a resistance R6 which represents the input impedance of the summing circuit 20 of the signal adding circuit 65. The relay 87 responds to the rewind command signal to actuate the switch arms 88 and 89 from the normally closed contacts NC1 and NC2 to the normally open contacts NO1 and NO2, respectively. The normally open contacts NO1 and NO2 are connected to the low pass clamping circuit branch 86.

The low pass clamping circuits 85 and 86 include similar components which bear identical reference symbols except that the symbols for the circuit branch 86 are primed. Therefore, only the circuit branch 85 will be described in detail.

When the rate damping signal is negative, the low pass circuit branch 85 is operative to clamp the low frequency signal components substantially to a predetermined negative voltage by means of a diode arrangement which includes diode D1 and Zener diode ZD1. The cathode electrode of diode D1 is connected by way of resistor R3 to the normally closed relay contact NC1. The anode electrodes of the diode D1 and the Zener diode ZD1 are connected by way of resistor R7 to the negative terminal of a voltage supply V3. The positive terminal, not shown, of the voltage supply V3 is grounded. The cathode electrode of the Zener diode is connected to ground, illustrated by the conventional ground symbol.

The Zener diode ZD1 is selected to have a reverse breakdown voltage which is substantially equal to the value of the rate damping signal for the condition where the reel 10 is FIG. 1 is full of tape. Consequently, the rate damping signal becomes clamped to the breakdown voltage of the Zener diode ZD1 irrespective of how much tape is wound on the reel 10.

When the rate damping signal is positive, the low pass circuit branch 85 is operative to clamp the low frequency signal components to a predetermined positive voltage by means of another diode arrangement including diode D2 and Zener diode ZD2. The anode of diode D1 is connected to the circuit junction 90. The cathode electrodes of the diode D2 and the Zener diode ZD2 are connected by way of resistor R8 to the positive terminal of a voltage supply V4. The negative terminal, not shown, of the voltage supply V4 is grounded. The anode electrode of the Zener diode ZD2 is connected to ground.

The Zener diode ZD2 is also selected to have a reverse breakdown voltage which is substantially equal to the value of the rate damping signal for the condition where the reel 10 in FIG. 1 is full of tape. Consequently, the rate damping signal becomes clamped to a positive voltage which is equal to the absolute value of the breakdown voltage of the Zener diode ZD2 irrespective of how much tape is wound on the reel 10.

The circuit point 90 is coupled to a low pass filter. The low pass filter network includes a series resistor R4 and a shunt capacitor C2. An isolating resistor R5 couples the filter network to the relay contact NC2.

The low pass filter network is operative to pass only the low frequency components of the rate damping signal. The principal low frequency component of the rate damping signal during a continuous forward reverse or rewind operational mode results from the change of the amount of tape wound on the reel 10. Thus, the low pass filter and the clamping circuit 85 cooperate together to clamp only the low frequency components of the rate damping signal to a constant predetermined absolute value during continuous run operation.

The low pass clamping circuit 86 differs from the low pass clamping circuit 85 in that it is operative only during the rewind mode to clamp the rate damping signal to relatively larger voltages. Thus, Zener diodes ZD1′ and ZD2′ are selected to have relatively larger breakdown voltages and the voltage supplies V3′ and V4′ are selected to have larger values relative to the voltage supplies V3 and V4.

The high pass circuit branch 83 includes a nonlinear attenuator 91 and a high pass filter network 92. The nonlinear attenuator 91 includes resistors R9 and R10 coupled in common to a circuit point 93. The other terminal of the resistor R9 is connected to the circuit point 81; while the other terminal of the resistor R10 is connected to a circuit point 94.

The circuit point 94 is connected to a diode arrangement which is similar in structure to the clamping circuits 85 and 86, but differs therefrom in operation as hereinafter becomes apparent. The cathode and anode of diodes D3 and D4, respectively, are connected to the circuit point 94. The anode and cathode of diodes D3 and D4 are coupled by way of different resistors R11 and R12 to the negative and positive terminals of voltage supplies V5 and V6, respectively. The positive and negative terminals, not shown, of the voltage supplies V5 and V6 are grounded. The Zener diodes ZD3 and ZD4 are connected between the anode and cathode of the diodes D3 and D4 and ground. The Zener diodes are poled as illustrated in FIG. 2.

The circuit point 93 is coupled by way of the high pass filter 92 to the output point 84. The high pass filter 92 includes capacitor C1 and resistance R2 connected in series.

The breakdown voltages of the Zener diodes ZD3 and ZD4 are selected to be larger than the amplitude of the rate damping signal during continuous run so that the nonlinear attenuator circuit 91 is inoperative for this mode of operation. Consequently, the high frequency signal components which are small in amplitude during continuous run are continuously passed by high pass filter 92 to the summing circuit 20 of the signal adding circuit 65, thereby tending to prevent oscillations in the servo system.

During the cycling operational mode, it is desirable to supply more power to the reel motors in order to more rapidly supply and take up tape from the tap reservoirs. As the tape loop position changes during cycling, the reel speed also changes so that the rate damping signal amplitude increases rapidly in either the positive or negative direction. The signal is comprised primarily of transients or high frequency components and has an amplitude which is large enough to render either the diode D3 or the diode D4 conductive depending upon the polarity of the rate damping signal. In contrast to the diodes D1 and D2 which are biased well beyond the knee of the voltage current diode characteristic in response to the rate damping signal during continuous run, the conducting one of the diodes D3 and D4 is merely biased into the knee region of the characteristic. The net result is that the diode acts as a variable resistance, that is, its resistance decreases as the rate damping signal amplitude increases. The current amplitude in resistance R10 and the conducting one of the diodes D3 and D4 increases as the resistance of the conducting diode decreases. The voltage at circuit point 93 accordingly decreases. Thus, as the rate damping signal amplitude increases, the nonlinear attenuator operates to provide increasing signal attenuation so that the rate damping signal becomes more attenuated as the reel and reel motor speed increases. Since the rate damping signal is a negative feedback signal, more power is supplied to the reel motor thereby tending to more rapidly supply or take up tape from the associated tape reservoir.

It is apparent that the nonlinear attenuator 91 is an alternative to the loop sensor signal being made variable in accordance with the distance of the tape loop from the position 71 (FIG. 1). Ordinarily, only one of the alternative techniques is used.

From the foregoing description, it is seen that the invention provides in the right reel servo of a tape station a nonlinear circuit for clamping the low frequency components of the rate damping signal to a predetermined value irrespective of the amount of tape wound on the reel 10 and for nonlinearly attenuating the high frequency components of the rate damping signal during cycling operation. It is apparent that the nonlinear circuit 16′ in the left reel servo is similarly operative to clamp the low frequency components of the rate damping signal to a predetermined absolute value irrespective of how much tape is wound on the reel 10′ during continuous run and to nonlinearly attenate the high frequency components of the rate damping signal during cycling operation.

What is claimed is:

1. A tape reel servo arrangement for a magnetic tape system which includes a source of command signal energy, tape reel means upon which a magnetic tape is wound, a reel motor means coupled to drive said reel means, a capstan means for driving said tape, said tape reel servo arrangement comprising, a tachometer generator means coupled to said reel motor means for developing rate damping signal energy, first circuit means including a nonlinear attenuator for attenuating said rate damping signal, the impedance of the attenuator varying as a function of the rate damping signal amplitude such that the impedance decreases as the rate damping signal amplitude increases, and second circuit means for adding said attenuated rate damping signal energy and said command signal energy and for applying the sum thereof to said reel motor means.

2. A tape reel servo arrangement for a magnetic tape system which includes a source of command signal energy, tape reel means upon which a magnetic tape is wound, a reel motor means coupled to drive said reel means, a capstan means for driving said tape, said tape reel servo arrangement comprising, a tachometer generator means coupled to said reel motor means for developing rate damping signal energy, first circuit means including a clamping circuit for clamping said rate damping signal energy to a predetermined value, said first circuit means further including a low pass filter coupled to said clamping circuit for passing only the low frequency components of said clamped rate damping signal energy, and second circuit means for adding said attenuated rate damping signal energy and said command signal energy and for applying the sum thereof to said reel motor means.

3. The invention according to claim 1 wherein said nonlinear attenuator includes a first resistance having one terminal connected to receive said rate damping signal from said tachometer, a second resistor, a diode, and a Zener diode connected in series in the named order between the other terminal of said first resistor and a point of fixed reference potential, means for biasing said diode and Zener diode so that said diode operates as a variable resistance, and means for connecting said other terminal of said first resistor to said signal adding cricuit.

4. The invention according to claim 3 wherein said rate damping signal energy, and a high pass filter for linearly passing the high frequency components of said rate damping signal energy to said adding circuit means.

5. The invention according to claim 4 wherein said clamping arrangement and said low pass filter are coupled in a first series branch which is coupled in parallel with a second series branch in which said high pass filter is connected.

6. The invention according to claim 5 wherein said command signal energy includes forward, reverse and rewind signals, said tape reel means and reel motor means include a pair of reels driven by different ones of a pair of reel motors, said capstan means includes a pair of capstans disposed between said reel means, and said tape reel servo arrangement includes separate servos for each reel and its associated reel motor, said separate servos including similar tachometer generators and similar first and second circuit means.

7. The invention according to claim 6 wherein said first circuit means of each servo includes two of said series branches, and a switching means is provided for connecting said high pass filter in parallel with a first one of said series branches in response to said forward and reverse command signals and for connecting said high pass filter in parallel with said second series branch in response to said rewind command signal.

8. The invention according to claim 7 wherein a pair of tape loop reservoirs for forming tape loops therein are each positioned between different ones of said reels and said capstans, a pair of tape loop position sensors are each disposed adjacent different ones of said tape loop reservoirs for developing tape loop signals in response to deviations of said tape loop from a reference position, and said signal adding circuit means further adding said tape loop signals with said command and rate damping signals.

9. The invention as claimed in claim 2, wherein said first circuit means further includes a nonlinear attenuator for attenuating said rate damping signal, the impedance of the attenuator varying as a function of the rate damping signal amplitude such that the impedance decreases as the rate damping signal amplitude increases.

10. The invention as claimed in claim 6 wherein a nonlinear attenuator is connected in said second circuit branch, said nonlinear attenuator being inoperative when the rate of occurrence of said command signals is relatively low so that said high pass filter linearly passes the high frequency components of said rate damping signal, said nonlinear attenuator becoming operative as said command signal rate increases, the attenuation of said rate damping signal increasing as the rate damping signal amplitude increases.

References Cited

UNITED STATES PATENTS 3,250,480 5/1966 Jacoby ----------- 242—55.12

LEONARD D. CHRISTIAN, *Primary Examiner.*